(12) United States Patent
Hamman et al.

(10) Patent No.: US 11,429,453 B1
(45) Date of Patent: Aug. 30, 2022

(54) REPLICATING AND MANAGING AGGREGATED DESCRIPTIVE DATA FOR CLOUD SERVICES

(71) Applicant: Amazon Technologies, Inc., Seattle, WA (US)

(72) Inventors: Richard Hamman, Cape Town (ZA); Kevin Pakiry, Cape Town (ZA); Gareth Lennox, Cape Town (ZA); Fernand Sieber, Cape Town (ZA); Thomas George Mathew, Cape Town (ZA); Pavel Tcholakov, Cape Town (ZA); Graeme Kruger, Cape Town (ZA); Bhavani Morarjee, Cape Town (ZA); Tarek Khaled Ismail Eltalawy, Alexandria, VA (US); Sara Mohamed Ali, Alexandria, VA (US); Paul Maree, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 50 days.

(21) Appl. No.: 16/913,993

(22) Filed: Jun. 26, 2020

(51) Int. Cl.
*G06F 9/50* (2006.01)
*H04L 67/133* (2022.01)
*G06F 9/54* (2006.01)

(52) U.S. Cl.
CPC ............ *G06F 9/5072* (2013.01); *G06F 9/505* (2013.01); *G06F 9/5077* (2013.01); *G06F 9/547* (2013.01); *H04L 67/40* (2013.01)

(58) Field of Classification Search
CPC ...... G06F 9/5072; G06F 9/505; G06F 9/5077; G06F 9/547; H04L 67/40
See application file for complete search history.

(56) References Cited

U.S. PATENT DOCUMENTS

| 10,523,712 B1 * | 12/2019 | Huang .................. G06F 17/17 |
| 2014/0195725 A1 * | 7/2014 | Bennett ................. G06F 12/06 |
| | | 711/103 |

OTHER PUBLICATIONS

U.S. Appl. No. 16/913,997, entitled "Managing Access to Aggregated Descriptive Data for Cloud Services," and filed on Jun. 26, 2020.
U.S. Appl. No. 16/913,978, entitled "Testing and Verifying Cloud Services Using a Computational Graph," and filed on Jun. 26, 2020.

* cited by examiner

*Primary Examiner* — Sisley N Kim
(74) *Attorney, Agent, or Firm* — Thomas Horstemeyer, LLP (57) ABSTRACT

Disclosed are various embodiments for replicating and maintaining aggregated descriptive data for cloud services. In one embodiment, updates to descriptive data that describes a resource of a customer provided by a cloud service are received by an aggregated descriptive data service from a backend service. An aggregated descriptive data store is then updated by the aggregated descriptive data service based at least in part on the received updates.

20 Claims, 8 Drawing Sheets

FIG. 6 ized computing resources on site or in a co-location facility, customers are able to dynamically allocate resources via the cloud provider network, while the cloud provider network manages the underlying hardware.

REPLICATING AND MANAGING AGGREGATED DESCRIPTIVE DATA FOR CLOUD SERVICES

BACKGROUND

A cloud provider network may offer a variety of computing resources that customers can provision on demand. To this end, the cloud provider network may support an application programming interface (API) that receives commands to allocate machine instances, application execution environments, applications, databases, and/or other forms of computing resources on behalf of a customer. The cloud provider network may also support an API for customers to query which computing resources are allocated on their behalf and the current status of those computing resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to replicating and managing aggregated descriptive data for cloud services. A cloud provider network may offer a variety of different types of computing resources as a service. These computing resources may include, for example, physical machine instances, virtual machine instances, application execution environments, hosted applications, database systems, and so on. Rather than maintaining their own hardware servers on site or in a co-location facility, customers are able to dynamically allocate resources via the cloud provider network, while the cloud provider network manages the underlying hardware.

As customers rely upon the cloud provider network to manage these computing resources, the cloud provider network may provide an application programming interface for customers to use to describe their currently allocated computing resources and to determine current status and/or system health information for each of the computing resources. Various services may be provided in the cloud provider network to respond to these descriptive information requests. These services may be executed in backend computing systems strategically positioned in the cloud provider network to have access to the descriptive information. However, by virtue of their location in the cloud provider network, these backend computing systems may be susceptible to overloading from customer-driven descriptive information requests. Further, load imposed by customer-driven descriptive information requests on these systems could potentially interfere with servicing requests that implement changes to computing resources and consequently the descriptive information.

In various embodiments, an aggregated descriptive data service provides a durable cache or view of data that is maintained in various backend computing systems. The aggregated descriptive data service is used to serve non-mutating customer requests for descriptive information about their computing resources in the cloud provider network. The aggregated descriptive data service is kept up-to-date by way of an event stream from the backend computing system sources. As customer requests are directed to the aggregated descriptive data service instead of directly to the various backend computing systems, the load upon the backend computing systems becomes stabilized and predictable.

In some embodiments, the aggregated descriptive data is replicated to a customer-specific aggregated descriptive data store. This has the benefit of not only isolating the backend services from customers, but also isolating the querying activity of individual customers from one another. The customer may have direct access to the customer-specific aggregated descriptive data store, and the customer-specific aggregated descriptive data store may be scaled up or down depending on the query load.

In some embodiments, replication of data from multiple sources is handled based at least in part on monotonicity of data. Data sources, such as backend services processing descriptive data updates, may transmit data updates in a certain order. However, when the data updates are received from multiple data sources potentially via multiple threads or processes, data representing a later state may be received before data representing an earlier state. If a delay in receiving a data update is observed, the replica can commit updates in-order, skipping missed updates. Alternatively, the replica may wait or block on later updates until the missing update is received. Queries may specify whether in-order data or the most up-to-date data is desired.

Figure 1A:
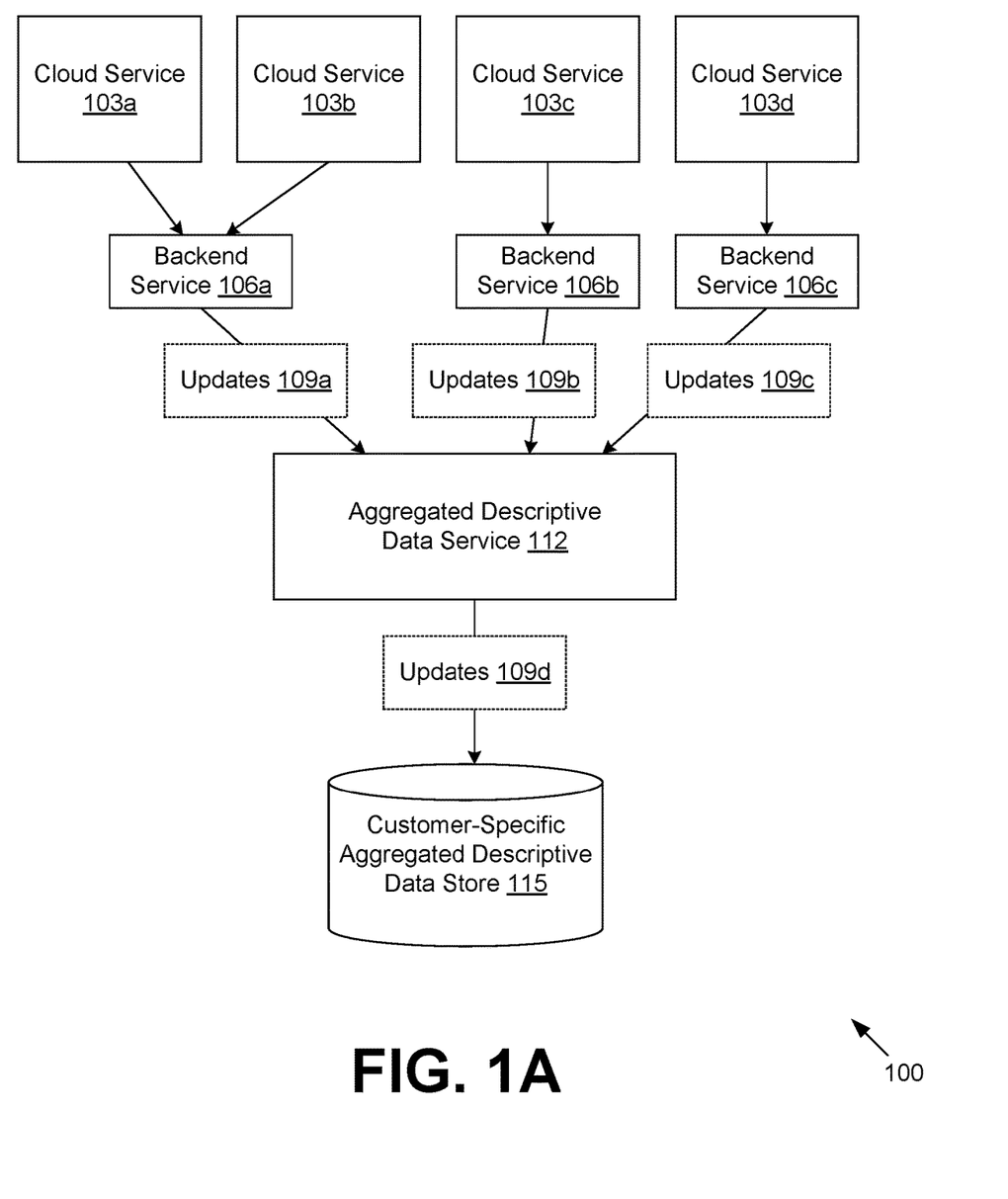
FIG. 1A is a drawing of an example scenario involving replication and management of descriptive data according to various embodiments of the present disclosure.

With reference to FIG. 1A, shown is an example scenario 100 involving replication and management of descriptive data according to various embodiments. In the scenario, a plurality of cloud services 103a, 103b, 103c, and 103d are associated with a customer in a utility computing environment serving multiple customers. A plurality of backend services 106a, 106b, and 106c may be configured to provide descriptive information about the cloud services instances 103, such as current status information and system health information. A single backend service 106 may provide descriptive information regarding multiple cloud services 103. In this case, the backend service 106a provides descriptive information regarding physical and/or virtualized computing resources provisioned by the cloud services 103a and 103b, while the backend service 106b provides descriptive information about physical and/or virtualized computing resources provisioned by the cloud service 103c, and the backend service 106c provides descriptive information about physical and/or virtualized computing resources provisioned by the cloud service 103d.

The backend services 106 provide respective streams of updates 109a, 109b, and 109c to the aggregated descriptive data service 112. This may be in lieu of providing an application programming interface (API) for customers to query the backend services 106 directly. The updates 109 may be associated with respective sequence numbers or timestamps that provide an order to the updates 109. The aggregated descriptive data service 112 then replicates the updates 109 as a stream of updates 109d to a customer-specific aggregated descriptive data store 115.

The customer-specific aggregated descriptive data store 115 may correspond to a data store that is owned, managed, and/or reserved for the individual customer. This results in a separation or isolation of respective customers' descriptive data querying activities. In various embodiments, customers may use a database client to query the customer-specific aggregated descriptive data stores 115 directly, or the customers may send API calls to the aggregated descriptive data service 112 to make descriptive data queries.

Figure 1B:
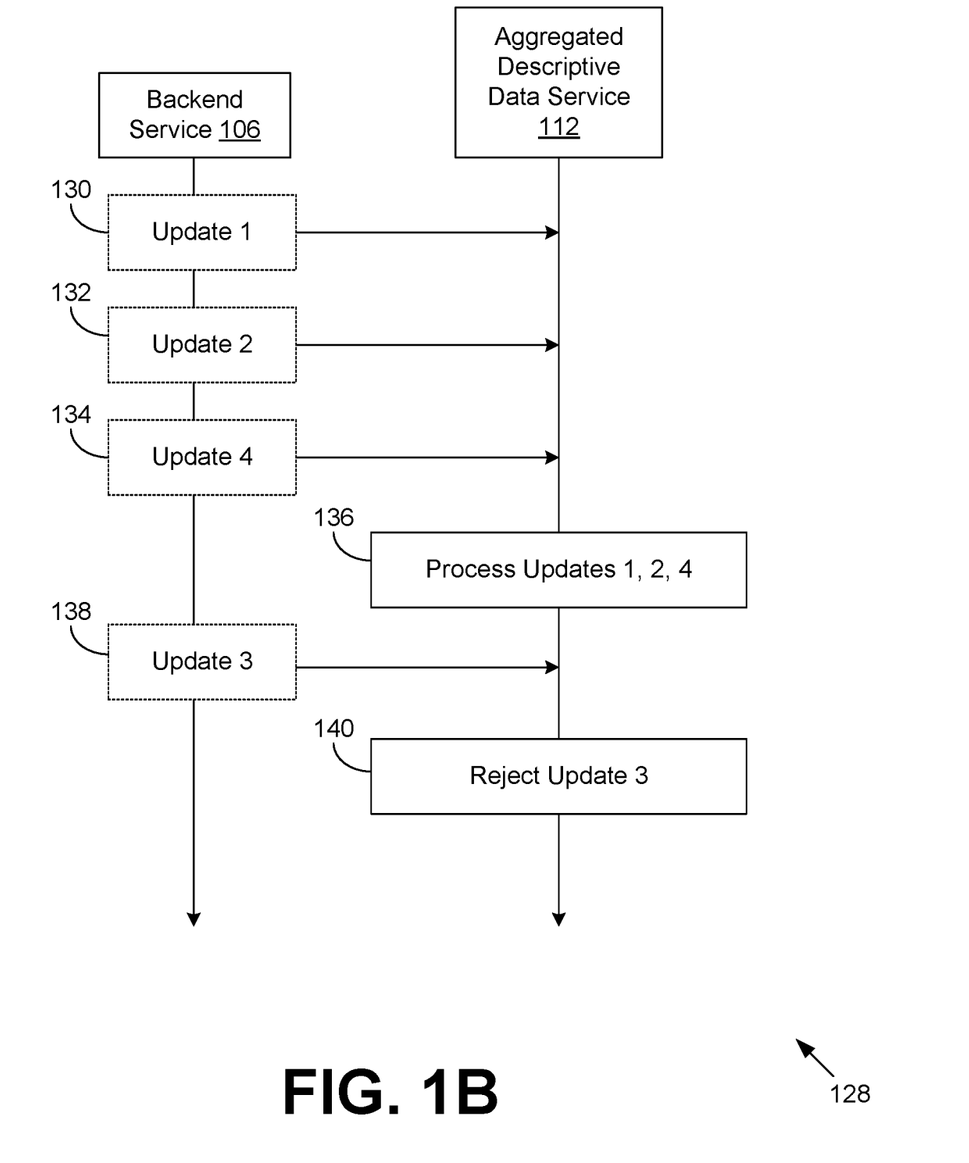
FIGS. 1B and 1C are sequence diagrams illustrating examples of interaction between a backend service and an aggregated descriptive data service according to various embodiments.

FIG. 1B is a sequence diagram 128 illustrating an example of interaction between a backend service 106 and an aggregated descriptive data service 112 according to various embodiments. In the sequence diagram 128, the backend service 106 sends a first update 109 (FIG. 1A) to the aggregated descriptive data service 112 at box 130, then a second update 109 to the aggregated descriptive data service 112 at box 132, and then a fourth update 109 to the aggregated descriptive data service 112 at box 134. The third update 109 in time or sequence may be delayed in transit.

Despite the delay of the third update 109, the aggregated descriptive data service 112 processes the first, second, and fourth updates 109 in a monotonic order in box 136. This can involve replicating the data to one or more data stores, such as the customer-specific aggregated descriptive data store 115 (FIG. 1A).

In box 138, the third update 109 is finally sent from the backend service 106 to the aggregated descriptive data service 112. However, at this time, the aggregated descriptive data service 112 has already processed an update 109 that is later in time, namely, the fourth update 109. Consequently, processing the third update 109 would not provide monotonic, in-order processing, and the aggregated descriptive data service 112 rejects the third update 109 in box 140. Reconciliation of the data may occur later to correct any data that was missed. Thereafter, the sequence diagram 128 ends.

Figure 1C:
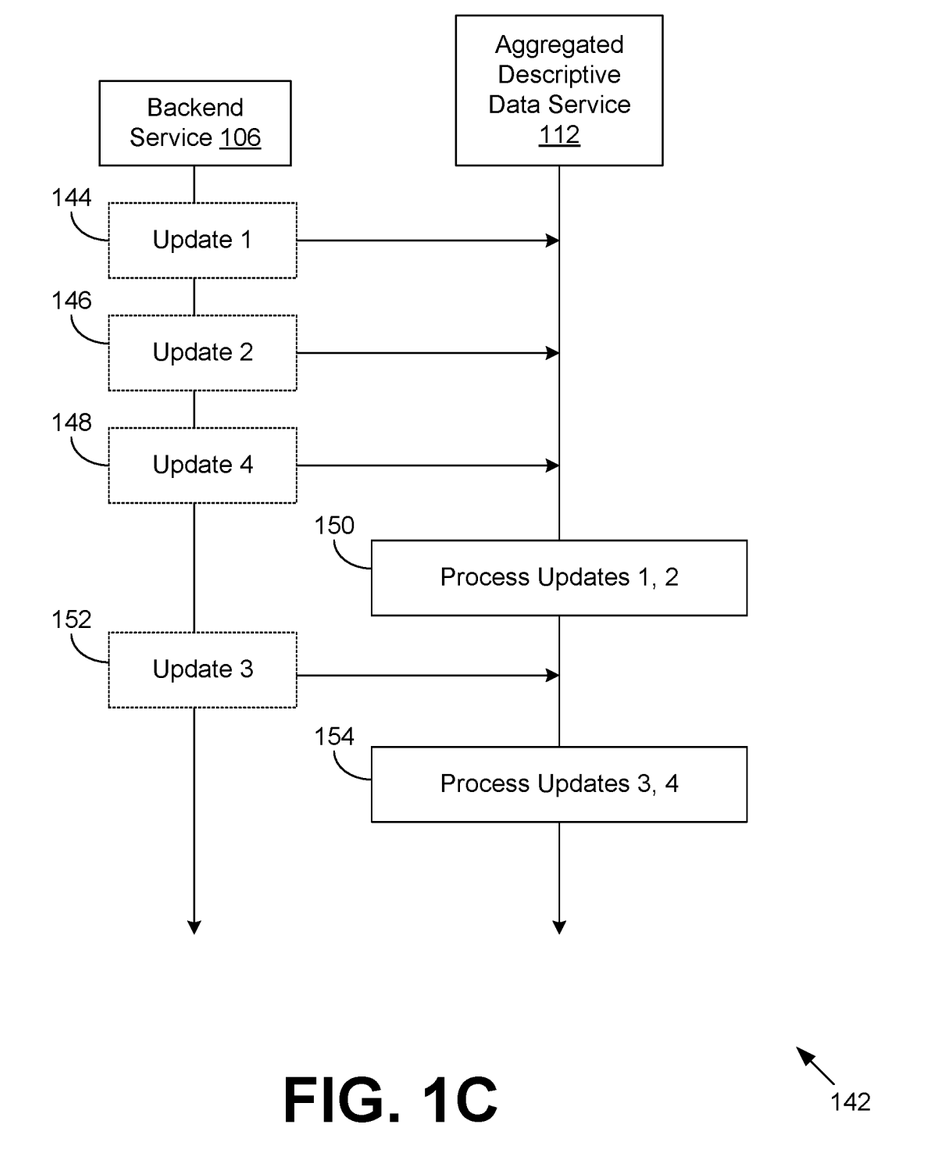

FIG. 1C is a sequence diagram 142 illustrating another example of interaction between a backend service 106 and an aggregated descriptive data service 112 according to various embodiments. In the sequence diagram 142, the backend service 106 sends a first update 109 (FIG. 1A) to the aggregated descriptive data service 112 at box 144, then a second update 109 to the aggregated descriptive data service 112 at box 146, and then a fourth update 109 to the aggregated descriptive data service 112 at box 148. The third update 109 in time or sequence may be delayed in transit.

Considering the delay of the third update 109, the aggregated descriptive data service 112 processes the first and second updates 109 in box 150, in a monotonic sequential order, but waits on processing the fourth update 109 because the third update 109 has not yet been received. Reasons for waiting for the third update 109 may be to provide a snapshot view, to provide a timeline of changed states, or for compliance purposes. Alternatively, the aggregated descriptive data service 112 may instead continue with processing the fourth update 109 but store one or more pointers or placeholders such that the third update 109 can be processed after the fourth update 109 without reverting data that has been modified in the fourth update 109 to a previous state. Processing the updates may involve replicating the data to one or more data stores, such as the customer-specific aggregated descriptive data store 115 (FIG. 1A).

In box 152, the third update 109 is finally sent from the backend service 106 to the aggregated descriptive data service 112. The aggregated descriptive data service 112 then processes, in sequential monotonic order, the third update 109 and then the fourth update 109 in box 154, even though the fourth update 109 was received prior in time to the third update 109. Thereafter, the sequence diagram 142 ends. In the following discussion, a general description of the system and its components is provided, followed by a discussion of the operation of the same.

Figure 2:
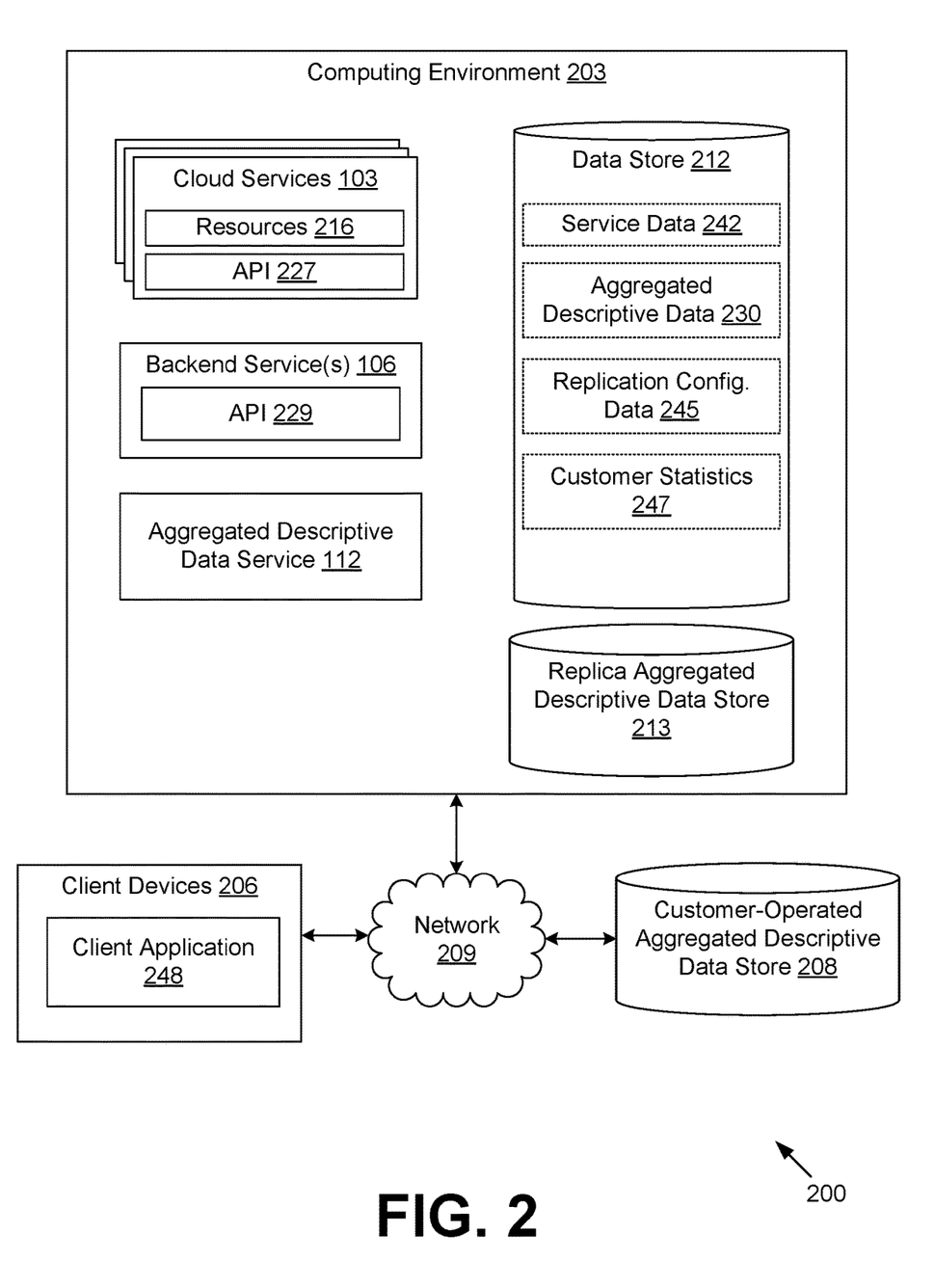
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more client devices 206, and one or more customer-operated aggregated descriptive data stores 208, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The networked environment 200 may correspond to a cloud provider network (sometimes referred to simply as a "cloud"), which is a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Example regions include U.S. East (located on the east coast of the U.S.), U.S. West (located on the west coast of the U.S.), Europe—London, and Europe—Paris. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) to access resources and services of the cloud provider network. Transit Centers (TC) are the primary backbone locations linking customers to the networked environment 200, and may be co-located at other network provider facilities (e.g., Internet service providers, telecommunications providers). Each region can operate two TCs for redundancy.

Generally, the traffic and operations of a cloud provider network may broadly be subdivided into two categories: control plane operations carried over a logical control plane and data plane operations carried over a logical data plane. While the data plane represents the movement of user data through the networked environment 200, the control plane represents the movement of control signals through the networked environment 200. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

In some embodiments, the computing environment 203 may correspond to a virtualized private network within a physical network comprising virtual machine instances executed on physical computing hardware, e.g., by way of a hypervisor. The virtual machine instances may be given network connectivity by way of virtualized network components enabled by physical network components, such as routers and switches.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below. In various embodiments, the computing environment 203 may include one or more replica aggregated descriptive data stores 213.

The components executed on the computing environment 203, for example, include one or more cloud services 103, one or more backend services 106, an aggregated descriptive data service 112, and other applications, services, processes, systems, engines, or functionality not discussed in detail herein.

The cloud services 103 may be configured to enable a wide variety of functionality. In various embodiments, the individual cloud services 103 may provide a service that allows customers to dynamically launch and manage physical or virtual computing resources 216, such as machine instances, an eventually consistent data storage service where data is stored in respective buckets, a database service that supports key-value and document data structures, a distributed message queuing service, a workflow management service, and/or other services. Each of the cloud services 103 may be associated with a corresponding application programming interface (API) 227 that supports a set of calls, or operations, that the respective cloud service 103 can perform. Making a call to an API 227 may invoke a sequence of many different services or agents to perform operations and process data.

The backend services 106 perform management and control functions relating to the cloud services 103. In various embodiments, the backend services 106 are implemented in the control plane of the computing environment 203 and the networked environment 200. One function that may be performed by the backend services 106 is to provide descriptive information about a customer's resources 216 that are provided by the cloud services 103. The backend services 106 may include an API 229. In one example, the API 229 may support obtaining descriptive information regarding a customer's allocated computing resources implemented through the respective cloud service 103. This descriptive information may include status information, system health information, performance metrics, and other descriptive information.

The aggregated descriptive data service 112 is executed to receive event updates with descriptive information for the resources 216 provided by the cloud services 103 via the API 229 of the backend services 106 and to store the updates as aggregated descriptive data 230 in the data store 212. As such, the aggregated descriptive data service 112 is able to provide a materialized view or durable cache of the descriptive information regarding the cloud services 103, without the need for customers to query descriptive data APIs 229 for the backend services 106 directly. In various embodiments, the aggregated descriptive data service 112 may query the descriptive data APIs 229 periodically, or the aggregated descriptive data service 112 may receive a stream of updates from the backend services 106 periodically or in response to a change in status that results in a new event. In some embodiments, the aggregated descriptive data service 112 may perform reconciliation procedures on one or more replica aggregated descriptive data stores 213 and/or the customer-operated aggregated descriptive data stores 208 to ensure that they store the latest state of descriptive data in synchronization.

The data stored in the data store 212 includes, for example, service data 242, aggregated descriptive data 230, replication configuration data 245, customer statistics 247, and potentially other data. The service data 242 may correspond to data stored by various cloud services 103. The service data 242 may be objects stored on behalf of the cloud services 103 and/or intermediate data used by the cloud services 103 to perform operations and/or generate results.

The aggregated descriptive data 230 is a current set of descriptive information for the cloud services 103. The aggregated descriptive data 230 may indicate status information and/or health information for the respective cloud services 103. It is noted that the aggregated descriptive data 230 may include descriptive data for different types of cloud services 103. The data store 212 may be considered a leader aggregated descriptive data store based on the aggregated descriptive data 230 stored thereon, which is then replicated to the replica aggregated descriptive data stores 213.

The replication configuration data 245 may configure how the descriptive data updates from the backend services 106 are replicated by the aggregated descriptive data service 112 to the aggregated descriptive data 230, replica aggregated descriptive data stores 213, and/or customer-operated aggregated descriptive data stores 208. To this end, the replication configuration data 245 may include parameters that control scaling, or adjusting resources in response to query load thresholds. In some cases, with low volume query loads, the descriptive data queries may be routed directly to the backend services 106, with the descriptive data being aggregated and/or replicated only when the query load is determined to meet a threshold and/or customer resource counts meet a threshold. The replication configuration data 245 may control whether the latest data is maintained for the replica, or whether updates are to be applied monotonically in-order. The replication configuration data 245 may specify a uniform resource locator (URL) and/or other information used to connect with and replicate descriptive data to the customer-operated aggregated descriptive data stores 208.

The replication configuration data 245 may include rules that configure how the aggregated descriptive data 230 is partitioned among multiple replica aggregated descriptive data stores 213. In one example, the aggregated descriptive data 230 may be partitioned based at least in part on customer. In another example, the aggregated descriptive data 230 may be partitioned based at least in part on the type of, or a characteristic of, the cloud service 103. For example, it may be more efficient to keep descriptive data for a particular cloud service 103 on the same data store as other data that is frequently joined to it in a database "JOIN" query. Some rules may require specific types of aggregated descriptive data 230 to be kept separately.

The customer statistics 247 may include customer descriptive data query loads that track customer query volumes for descriptive data queries, customer resource counts, and/or other statistics. Some customers may seldom issue descriptive data queries, while other customers may so frequently originate such queries that additional resources are used to respond to the queries. Also, customers with relatively low resource counts may not impose a significant load with respect to event stream monitoring, even if the customers seldom issue queries, which may weigh toward aggregating the descriptive data. The customer descriptive data query loads and/or resource counts may be used in conjunction with threshold comparisons to determine an appropriate level of resources for responding to queries regarding a particular customer's cloud services 103.

The client device 206 is representative of a plurality of client devices that may be coupled to the network 209. The client device 206 may comprise, for example, a processor-based system such as a computer system. Such a computer system may be embodied in the form of a server computer, a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

The client device 206 may be configured to execute various applications such as a client application 248 and/or other applications. The client application 248 may be executed in a client device 206, for example, to access network content served up by the computing environment 203 and/or other servers. To this end, the client application 248 may comprise, for example, a service client, a browser, a dedicated application, etc. The client device 206 may be configured to execute applications beyond the client application 248 such as, for example, email applications, social networking applications, word processors, spreadsheets, and/or other applications.

The customer-operated aggregated descriptive data stores 208 are mirrors or replicas of the aggregated descriptive data 230 that is aggregated by the aggregated descriptive data service 112. In contrast to the data store 212, the customer-operated aggregated descriptive data stores 208 may be operated and/or controlled by the customer and not provided by a utility computing provider like the cloud services 103. The customer-operated aggregated descriptive data stores 208 may correspond to a relational database system, a flat file data store system, and/or other types of data management systems. The customer-operated aggregated descriptive data stores 208 may be accessible for writing by the aggregated descriptive data service 112 by way of a uniform resource locator (URL).

Figure 3:
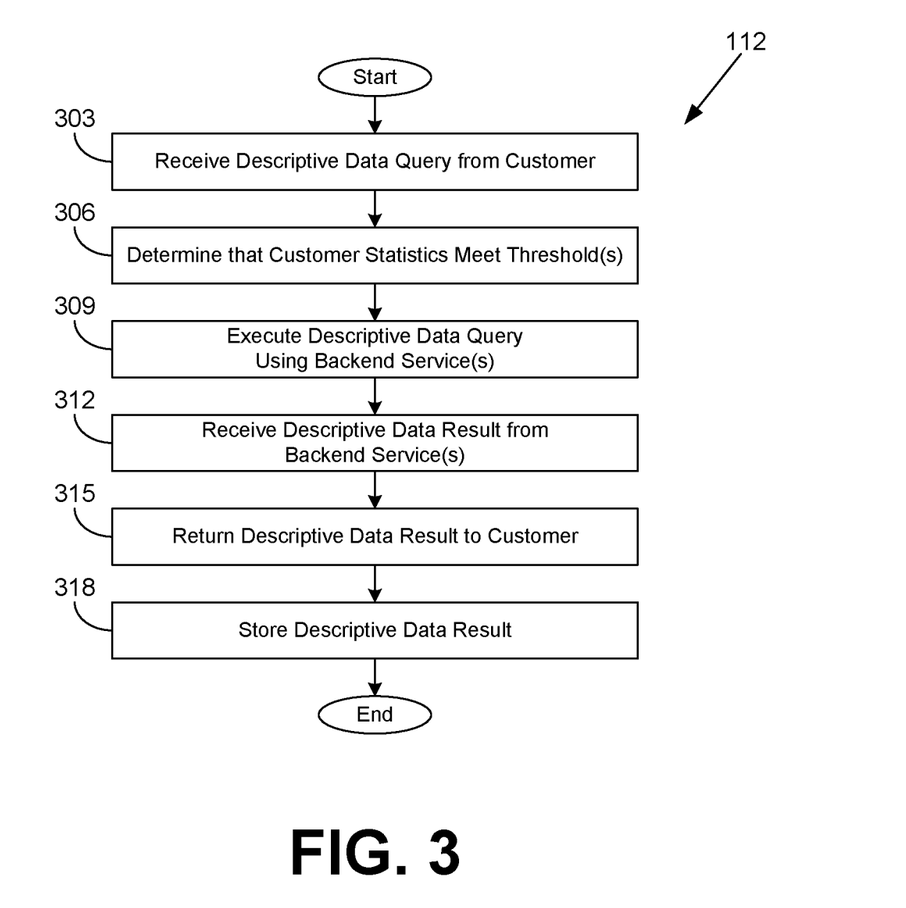
FIGS. 3-5 are flowcharts illustrating examples of functionality implemented as portions of an aggregated descriptive data service executed in a computing environment in the networked environment of FIG. 2 according to various embodiments of the present disclosure.

Referring next to FIG. 3, shown is a flowchart that provides one example of the operation of a portion of the aggregated descriptive data service 112 according to various embodiments. It is understood that the flowchart provides merely an example of the many different types of functional arrangements that may be employed to implement the operation of the portion of the aggregated descriptive data service 112 as described herein. As an alternative, the flowchart may be viewed as depicting an example of elements of a method implemented in the computing environment 203 (FIG. 2) according to one or more embodiments.

Beginning with box 303, the aggregated descriptive data service 112 receives a descriptive data query from a customer. For example, a client application 248 (FIG. 2) may issue a query via a descriptive data application programming interface (API) over the network 209 (FIG. 2).

In box 306, the aggregated descriptive data service 112 determines from the customer statistics 247 (FIG. 2) that the customer's descriptive data query load is below a threshold specified in the replication configuration data 245 (FIG. 2). For example, the customer may have a relatively low descriptive data query volume that receiving an event stream from the backend service 106 (FIG. 2) would impose a greater load than the infrequent queries from the users. The calculation may depend in part on the load associated with the event stream and resource counts. That is to say, frequent updates may impose a greater load than infrequent updates, so it may make sense to maintain a descriptive data replica from the event stream for a customer with a low query load when the event stream load is below a threshold.

In box 309, if the aggregated descriptive data service 112 determines that the customer descriptive data query load is below the threshold, the aggregated descriptive data service 112 executes the descriptive data query using the API 229 (FIG. 2) of one or more backend services 106. In so doing, the aggregated descriptive data service 112 routes the query to directly to the backend service 106 rather than to a replica or mirror of the data. In box 312, the aggregated descriptive data service 112 receives the descriptive data result from the backend service 106. In box 315, the aggregated descriptive data service 112 returns the descriptive data result to the client application 248 associated with the customer.

In box 318, the aggregated descriptive data service 112 may optionally store the descriptive data result in the aggregated descriptive data 230 (FIG. 2), a replica aggregated descriptive data store 213 (FIG. 2), and/or a customer-operated aggregated descriptive data store 208 (FIG. 2). By storing the result, the aggregated descriptive data service 112 may respond to a future query in some scenarios without contacting the backend services 106. Thereafter, the operation of the portion of the aggregated descriptive data service 112 ends.

Figure 4:
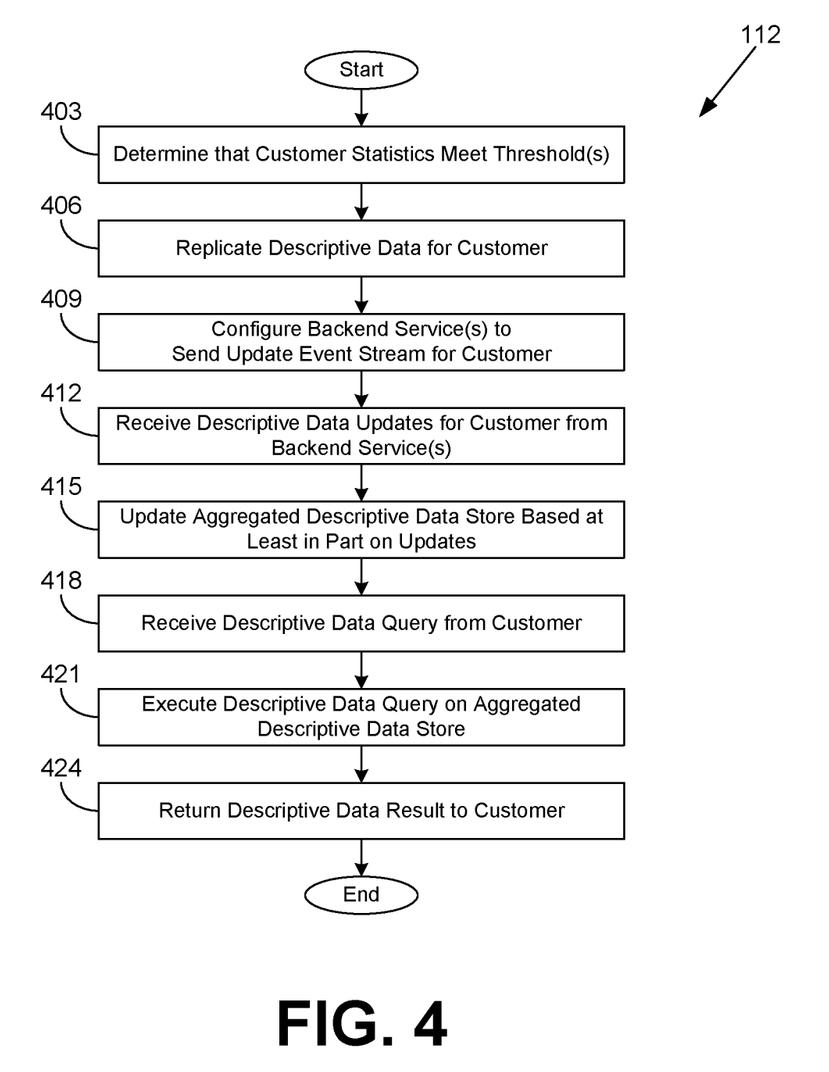

Moving on to FIG. 4, shown is a flowchart that provides one example of the operation of another portion of the aggregated descriptive data service 112 according to various embodiments. It is understood that the flowchart provides merely an example of the many different types of functional arrangements that may be employed to implement the operation of the portion of the aggregated descriptive data service 112 as described herein. As an alternative, the flowchart may be viewed as depicting an example of elements of a method implemented in the computing environment 203 (FIG. 2) according to one or more embodiments.

Beginning with box 403, the aggregated descriptive data service 112 determines that the customer statistics 247 (FIG. 2) meet one or more thresholds specified in the replication configuration data 245 (FIG. 2). For example, the aggregated descriptive data service 112 determines that the customer-imposed load on the backend service 106 (FIG. 2) from, for example, query load, would warrant receiving event updates from the backend service 106 and creating a replica of data. This determination may also be made with reference to the frequency of event updates and resource counts, as a low frequency of updates or few resources 216 (FIG. 2) may make maintaining a replica less demanding. As a consequence of this determination, the aggregated descriptive data service 112 may block the customer from making API calls or sending descriptive data queries to the backend service 106 directly.

In box 406, the aggregated descriptive data service 112 replicates the descriptive data for the customer. The descriptive data can be generated and replicated without regard to a request from the customer. For example, the aggregated descriptive data service 112 may query all of the descriptive data for the customer from the backend services 106 via the API 229 (FIG. 2) and then store it in the aggregated descriptive data 230 (FIG. 2) in the data store 212 (FIG. 2), in one or more replica aggregated descriptive data stores 213 (FIG. 2), and/or in one or more customer-operated aggregated descriptive data stores 208 (FIG. 2). In various scenarios, the aggregated descriptive data service 112 may create one or more of these data stores, and the computing resources dedicated to these data stores may be adjusted up or down, or scaled, based at least in part on the observed customer descriptive data query loads 247.

In box 409, the aggregated descriptive data service 112 configures the backend services 106 to send an update event stream to the aggregated descriptive data service 112 as updates to the descriptive data occur. In box 412, the aggregated descriptive data service 112 receives descriptive data updates for the customer from one or more of the backend services 106. In box 415, the aggregated descriptive data service 112 updates the aggregated descriptive data 230 in the data store 212, one or more replica aggregated descriptive data stores 213, and/or one or more customer-operated aggregated descriptive data stores 208.

In box 418, the aggregated descriptive data service 112 receives a descriptive data query from a customer. For example, the descriptive data query may be received via a descriptive data API from the client application 248 (FIG. 2) executed in a client device 206 (FIG. 2). In box 421, the aggregated descriptive data service 112 executes the descriptive data query on the aggregated descriptive data 230 and/or the replicated aggregated descriptive data store 213. In box 424, the aggregated descriptive data service 112 returns the descriptive data result to the customer via the network 209. Thereafter, the operation of the aggregated descriptive data service 112 ends.

Alternatively to boxes 418-421, the client application 248 may query a customer-operated aggregated descriptive data store 208 directly using a data store API and obtain results without the use of the aggregated descriptive data service 112, though the aggregated descriptive data service 112 sends updates to the customer-operated aggregated descriptive data store 208.

In a hybrid embodiment, a combination of FIGS. 3 and 4 may be used, where replicated data is maintained by the aggregated descriptive data service 112 and the backend services 106 are also queried in response to customer requests. In such an approach, a result may be obtained both from the aggregated descriptive data 230 and from the backend service 106. The result returned first may be returned, or as an alternative, the result with the most up-to-date data may be returned. Also, which approach is used may be service dependent. For example, some types of cloud services 103 may be excluded from descriptive data aggregation.

Figure 5:
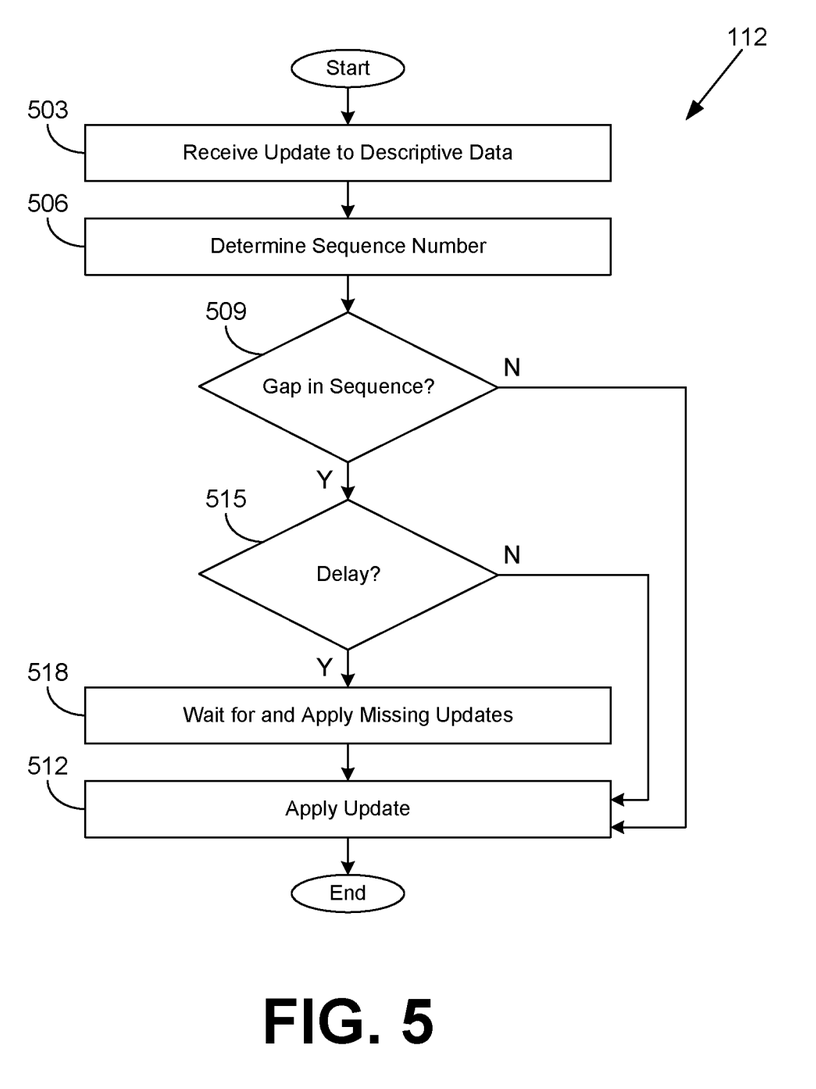

Continuing on to FIG. 5, shown is a flowchart that provides one example of the operation of another portion of the aggregated descriptive data service 112 according to various embodiments. It is understood that the flowchart provides merely an example of the many different types of functional arrangements that may be employed to implement the operation of the portion of the aggregated descriptive data service 112 as described herein. As an alternative, the flowchart may be viewed as depicting an example of elements of a method implemented in the computing environment 203 (FIG. 2) according to one or more embodiments.

Beginning with box 503, the aggregated descriptive data service 112 receives an update to descriptive data associated with a customer in an event stream from one or more of the backend services 106. It is noted that the aggregated descriptive data service 112 may receive events from multiple sources concurrently through the use of multiple processes or threads. The backend service 106 may be previously configured to send the event stream to the aggregated descriptive data service 112. Alternatively, the aggregated descriptive data service 112 may periodically or in response to an event (e.g., receiving a descriptive data query from a customer) poll the backend services 106.

In box 506, the aggregated descriptive data service 112 determines a sequence number or timestamp associated with the update. In box 509, the aggregated descriptive data service 112 determines whether there has been a gap in the sequence compared to a previously received update. If not, the aggregated descriptive data service 112 continues to box 512 and applies the update. This may involve updating data stored in the aggregated descriptive data 230 (FIG. 2), the replica aggregated descriptive data store 213 (FIG. 2), and/or the customer-operated aggregated descriptive data store 208 (FIG. 2). Thereafter, the operation of the portion of the aggregated descriptive data service 112 ends.

If there is a gap in the sequence, the aggregated descriptive data service 112 moves from box 509 to box 515 and determines whether to delay applying the update. For example, a flag in the replication configuration data 245 (FIG. 2) may indicate that the most up-to-date data is desired, or alternatively, that strict in-order monotonic processing is required. Different configurations may be offered to different customers who are willing to tolerate different tradeoffs of data freshness versus consistency.

If a delay is not to be utilized, the aggregated descriptive data service 112 continues from box 515 to box 512 and applies the update, even though previous or intermediate updates have not yet been applied. This may be possible through data sources that have a monotonic contract and idempotency at the row level. The aggregated descriptive data service 112 may store a pointer to track how the out-of-sequence update has been applied, such that the skipped update may be applied later without reverting data to a previous state. Reconciliation may update any missed or skipped data at a later time. Thereafter, the operation of the portion of the aggregated descriptive data service 112 ends.

If a delay is acceptable, the aggregated descriptive data service 112 instead continues from box 515 to box 518, where the aggregated descriptive data service 112 waits for and then applies the missing or skipped updates. The aggregated descriptive data service 112 then continues to box 512 and applies the current update. Thereafter, the operation of the portion of the aggregated descriptive data service 112 ends.

Figure 6:
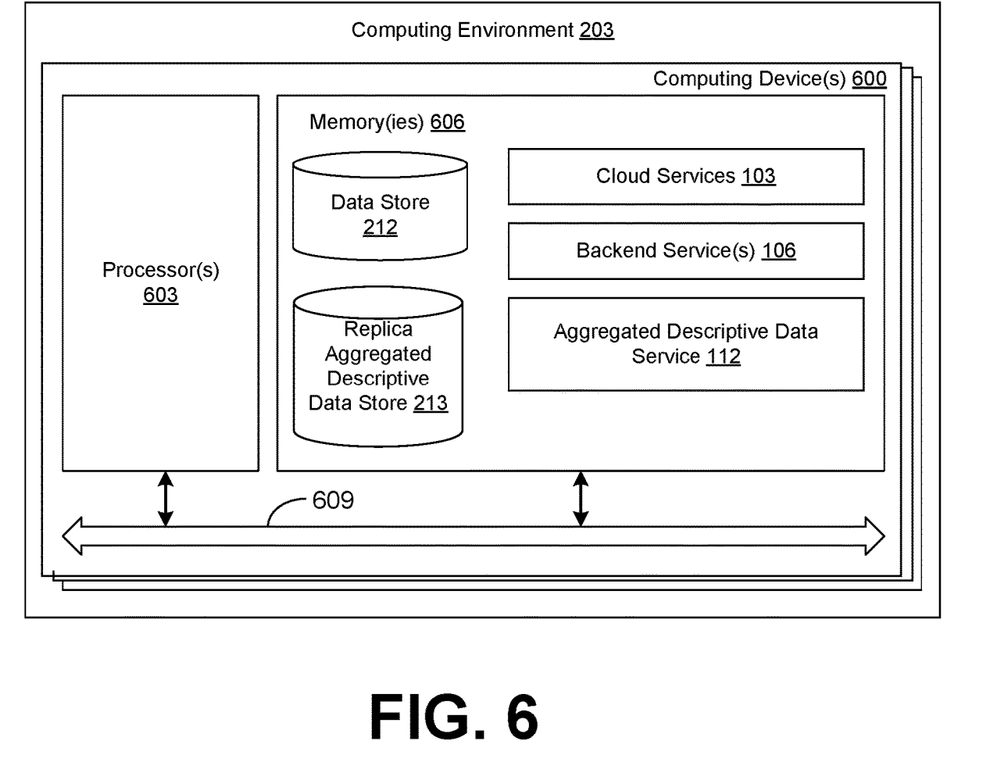
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the cloud services 103, the backend services 106, the aggregated descriptive data service 112, and potentially other applications. Also stored in the memory 606 may be a data store 212, a replica aggregated descriptive data store 213 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the cloud services 103, the backend services 106, the aggregated descriptive data service 112, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the aggregated descriptive data service 112. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the cloud services 103, the backend services 106, and the aggregated descriptive data service 112, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the cloud services 103, the backend services 106, and the aggregated descriptive data service 112, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   determine that a first descriptive data query load associated with a first customer meets a threshold;
   create an aggregated descriptive data store in response to the first descriptive data query load associated with the first customer meeting the threshold;
   receive a plurality of updates to descriptive data that describes resources of the first customer provided by a plurality of cloud services from a plurality of backend services;
   update the aggregated descriptive data store of the first customer by applying the plurality of updates in a monotonic order while skipping one or more intermediate or previous updates that have not been received, wherein the aggregated descriptive data store is one of a plurality of aggregated descriptive data stores maintained for individual ones of a plurality of customers, and the aggregated descriptive data store is updated without regard to a request from the first customer;
   receive a descriptive data query from a client application associated with the first customer via a descriptive data application programming interface (API);
   execute the descriptive data query on the aggregated descriptive data store;
   return a result of the descriptive data query to the client application;
   determine that a second descriptive data query load associated with a second customer does not meet the threshold; and
   route one or more descriptive data queries from the second customer directly to one or more of the plurality of backend services in response to determining that the second descriptive data query load associated with the second customer does not meet the threshold.

2. The non-transitory computer-readable medium of claim 1, wherein the descriptive data provides status information or health information regarding the plurality of cloud services.

3. The non-transitory computer-readable medium of claim 1, wherein when executed the program further causes the at least one computing device to at least block the first customer from sending the descriptive data query to the plurality of backend services.

4. A method, comprising:
   determining, by at least one computing device, that a first descriptive data query load associated with a first customer meets a threshold;
   creating, by the at least one computing device, an aggregated descriptive data store for the first customer in response to determining that the first descriptive data query load associated with the first customer meets the threshold;

receiving, by an aggregated descriptive data service executed in at least one computing device, at least one update to descriptive data that describes a resource of the first customer provided by a cloud service from a backend service;

updating, by the aggregated descriptive data service executed in the at least one computing device, the aggregated descriptive data store based at least in part on the at least one update;

determining, by the at least one computing device, that a second descriptive data query load associated with a second customer does not meet the threshold; and routing, by the at least one computing device, one or more descriptive data queries from the second customer directly to the backend service in response to determining that the second descriptive data query load associated with the second customer does not meet the threshold.

5. The method of claim 4, wherein the descriptive data is generated without regard to a request from the first customer.

6. The method of claim 4, further comprising:
receiving, by the at least one computing device, a descriptive data query from a client application associated with the first customer via a descriptive data application programming interface (API);

executing, by the at least one computing device, the descriptive data query on the aggregated descriptive data store; and returning, by the at least one computing device, a result of the descriptive data query to the client application.

7. The method of claim 4, further comprising:
receiving, by the at least one computing device, at least one other update to descriptive data that describes another cloud service of the first customer from another backend service; and updating, by the at least one computing device, the aggregated descriptive data store based at least in part on the at least one other update.

8. The method of claim 4, further comprising polling, by the at least one computing device, the backend service to receive the at least one update.

9. The method of claim 4, further comprising configuring, by the at least one computing device, the backend service to send the at least one update in an event stream.

10. The method of claim 4, further comprising adjusting, by the at least one computing device, computing resources allocated to the aggregated descriptive data store based at least in part on the first descriptive data query load associated with the first customer.

11. The method of claim 4, further comprising maintaining, by the at least one computing device, a plurality of aggregated descriptive data stores separately for individual ones of a plurality of first customers, wherein the aggregated descriptive data store is one of the plurality of aggregated descriptive data stores, and the first customer is one of the plurality of first customers.

12. The method of claim 4, further comprising sending, by the at least one computing device, the at least one update to at least one replica of the aggregated descriptive data store, wherein the at least one replica is configured to apply the at least one update in a monotonic order while skipping a previous update not yet received by the at least one replica.

13. A system, comprising:
at least one computing device; and
at least one service executable in the at least one computing device, wherein when executed the at least one service causes the at least one computing device to at least:

determine that a first descriptive data query load associated with a first customer meets a threshold;

create an aggregated descriptive data store in response to the first descriptive data query load associated with the first customer meeting the threshold;

receive a plurality of updates for data describing a resource provided by at least one cloud service, the plurality of updates having a monotonic order;

apply the plurality of updates to the aggregated descriptive data store in the monotonic order while skipping one or more intermediate or previous updates for the data describing the at least one cloud service that have not yet been received;

determine that a second descriptive data query load associated with a second customer does not meet the threshold; and route one or more descriptive data queries from the second customer directly to a backend service in response to determining that the second descriptive data query load associated with the second customer does not meet the threshold.

14. The system of claim 13, wherein when executed the at least one service causes the at least one computing device to at least, after the plurality of updates are applied to the aggregated descriptive data store, reconcile a difference between the aggregated descriptive data store and a leader aggregated descriptive data store to which the one or more intermediate or skipped updates have been applied.

15. The system of claim 13, wherein the plurality of updates are received from a plurality of backend services.

16. The system of claim 13, wherein the plurality of updates are received from a leader aggregated descriptive data store, and the aggregated descriptive data store is a replica of the leader aggregated descriptive data store.

17. The system of claim 13, wherein the at least one cloud service comprises a plurality of cloud services, and the plurality of updates are received from a plurality of backend services corresponding to at least two of the plurality of cloud services.

18. The system of claim 13, wherein when executed the at least one service causes the at least one computing device to at least maintain a plurality of aggregated descriptive data stores separately for individual ones of a plurality of first customers, wherein the aggregated descriptive data store is one of the plurality of aggregated descriptive data stores, and the first customer is one of the plurality of first customers.

19. The system of claim 13, wherein when executed the at least one service causes the at least one computing device to at least block the first customer from sending a descriptive data query to the backend service.

20. The system of claim 13, wherein when executed the at least one service causes the at least one computing device to at least adjust computing resources allocated to the aggregated descriptive data store based at least in part on the first descriptive data query load associated with the first customer.

* * * * *